(12) United States Patent
Augst

(10) Patent No.: US 8,797,351 B2
(45) Date of Patent: Aug. 5, 2014

(54) METHOD FOR GRAPHICALLY REPRESENTING THE SURROUNDINGS OF A MOTOR VEHICLE

(75) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1273 days.

(21) Appl. No.: 11/926,572

(22) Filed: Oct. 29, 2007

(65) Prior Publication Data
US 2008/0100614 A1 May 1, 2008

Related U.S. Application Data

(63) Continuation of application No. PCT/EP2006/003902, filed on Apr. 27, 2006.

(30) Foreign Application Priority Data

Apr. 28, 2005 (EP) ..................................... 05009287

(51) Int. Cl.
G09G 5/00 (2006.01)

(52) U.S. Cl.
USPC ........... 345/632; 345/619; 345/629; 345/636; 345/667; 348/148; 382/154; 382/206; 382/286; 340/435; 340/436; 701/301

(58) Field of Classification Search
USPC ......................................................... 345/637
See application file for complete search history.

(56) References Cited

U.S. PATENT DOCUMENTS

| 6,578,017 | B1 * | 6/2003 | Ebersole et al. ................... 706/3 |
| 7,049,945 | B2 * | 5/2006 | Breed et al. ................... 340/435 |
| 7,068,289 | B2 * | 6/2006 | Satoh et al. ................... 345/629 |
| 7,136,754 | B2 * | 11/2006 | Hahn et al. ................... 701/301 |
| 7,256,688 | B2 * | 8/2007 | Mizusawa ................... 340/461 |
| 2002/0171739 | A1 | 11/2002 | Yamada |
| 2003/0210228 | A1 | 11/2003 | Ebersole et al. |
| 2004/0220724 | A1 | 11/2004 | Hahn et al. |

FOREIGN PATENT DOCUMENTS

EP 1 462 762 A1 9/2004

OTHER PUBLICATIONS

International Search Report dated Jul. 6, 2006 with English translation (Six (6) Pages).

* cited by examiner

Primary Examiner — Antonio A Caschera
(74) Attorney, Agent, or Firm — Crowell & Moring LLP

(57) ABSTRACT

In a method for graphically representing the surroundings of a motor vehicle, whereby graphical elements, which serve to assist the driver in interpreting the spatial information, contained in the scene image, are superimposed on a scene image, which represents a three dimensional surrounding scene of the surroundings of the motor vehicle and which is out two dimensionally or three dimensionally to the driver of the motor vehicle, the graphical elements are at least partially configured and arranged in the scene image such that they embody in the surrounding scene at least one virtual boundary object, which has a three dimensional spatial shape and which exhibits at least one reference surface that delimits a free space, which can be attained by the motor vehicle without the risk of a collision, from an obstacle space, which can be attained only with the risk of a collision.

20 Claims, 2 Drawing Sheets

METHOD FOR GRAPHICALLY REPRESENTING THE SURROUNDINGS OF A MOTOR VEHICLE

CROSS-REFERENCE TO RELATED APPLICATIONS

This application is a continuation of PCT International Application No. PCT/EP2006/003902, filed on Apr. 27, 2006, which claims priority under 35 U.S.C. §119 to European Application No. 05009287.3, filed Apr. 28, 2005, the entire disclosures of which are expressly incorporated by reference herein.

BACKGROUND AND SUMMARY OF THE INVENTION

The present invention relates to a method for graphically representing the surroundings of a motor vehicle. In this method, graphical elements, which serve to assist the driver in interpreting the spatial information, contained in the scene image, are superimposed on a scene image. The scene image represents a three dimensional scene of the surroundings of the motor vehicle and is output two dimensionally or three dimensionally to the driver of the motor vehicle.

To assist the driver of a motor vehicle in assessing the spatial conditions surrounding the motor vehicle, it is known to represent the surroundings of the motor vehicle in a scene image and to output this scene image to the driver.

Such a scene image is typically output to the driver by way of a graphics display device. In so doing, the rendering can occur two dimensionally by use of conventional image representation means, for example, a conventional monitor, or three dimensionally by use way of image representation means, which are suitable for a three dimensional presentation. Suitable three dimensional image representation means, which are suitable for a three dimensional presentation are, for example, lenticular or holographic image representation means. In many cases the scene image represents a spatial, thus three dimensional, surrounding scene. The motor vehicle itself, or a part of the motor vehicle or a symbol for the same, can be a part of the depicted surrounding scene.

The scene image is typically obtained with at least one image capturing device, for example a camera, in particular a reversing camera, of the motor vehicle. As an alternative, the scene image can be generated with the aid of a computer. Optionally, a real image that is captured so as to be distorted can be depicted rectified for a clearer presentation.

Furthermore, it is known to superimpose graphical elements, which serve to assist the driver in interpreting the spatial information contained in the scene image, on the scene image, output to the driver.

For example, it is known from the US 2002/0175999 A1 to superimpose graphical elements, in particular warning lines, on a captured camera image during its display in order to assist the driver in interpreting the depicted image. However, the interpretation of such warning lines and the derivation of an operational behavior, which has changed in accordance with the depicted situation, are extremely difficult to do precisely for the driver, who is not familiar with such image representation methods.

From EP 1 469 422A1, it is known to render graphically a motor vehicle's future position, which is predicted from the current steering angle, in a scene image, output to the driver. Similarly, the drawback with this method is that the interpretation is difficult for the driver, who is not familiar with such image representation methods. In addition, such a rendering is highly tailored to an evaluation and optionally the adaptation of the driver's operational behavior—for example, a change in the steering angle. However, many drivers do not want any suggestions in regard to their operational behavior or an evaluation of their current operational behavior, for which reason many drivers perceive such a form of representation to be unnecessary or even disturbing.

The present invention provides a method of the aforementioned genre, which enables a mode of representing the surrounding scene that optimally assists the driver in interpreting the surrounding scene.

According to the invention, a method is provided wherein the graphical elements, superimposed on the scene image, are at least partially configured and arranged in the scene image in such a manner that they embody in the surrounding scene at least one virtual boundary object, which has a three dimensional spatial shape and which exhibits at least one reference surface that delimits a free space, which can be attained by the motor vehicle without the risk of a collision, from an obstacle space, which can be attained only with the risk of a collision.

The invention makes it especially easy for the driver to interpret a graphical element-enriched rendering of a three dimensional surrounding scene since the graphical elements can be included in the surrounding scene by intuition, in particular without having to re-think. This is the case especially when the rendering of the surrounding scene is enriched partially or exclusively with graphical elements, which the driver perceives to be spatial objects, arranged in the surrounding scene. Therefore, the graphical elements, which are superimposed, according to the invention, on the scene image, are configured and arranged in the scene image in such a manner that they embody virtual objects that are arranged in the three dimensional surrounding scene and exhibit there a three dimensional spatial shape. The composite rendering corresponds to the driver's experience and can be interpreted by the driver without a lot of interpretative activity.

Graphical elements, for example artificial lines or warning lines, which are superimposed, according to the prior art, on a scene image of a three dimensional surrounding scene, do not have any spatial shape or do not have at least any clearly recognizable spatial shape in the surrounding scene. Thus, in the best case scenario, the driver can interpret these graphical elements as markings or in the worst case scenario has to switch back and forth in his mind between the three dimensional surrounding scene and a virtual plane, superimposed on the surrounding scene. It is just as disadvantageous if the driver does integrate mentally the graphical elements in the surrounding scene, but the embodiment of the graphical elements in the surrounding scene has no spatial shape or has at least no clearly recognizable spatial shape that is commensurate with the driver's experience. In all of these cases, the interpretation of the graphical elements, which are superimposed, according to the prior art, requires an unnecessarily large amount of interpretative activity on the part of the driver.

If, in contrast, the scene image, which is output to the driver, is prepared, according to the invention, in such a manner that in the driver's perception the three dimensional surrounding scene is enriched with objects, which exhibit a three dimensional spatial shape in the surrounding scene, then a reliable interpretation of the spatial conditions in the surrounding scene is possible by the driver with a relatively small amount of interpretative activity.

Hence, a prerequisite is a rendering of the virtual objects that the driver can perceive to be both spatially correct and consistent with the surrounding scene. Such a rendering can be easily carried out with today's well-known and available methods and devices for generating and graphically outputting three dimensional scenes.

Driver's assistance by graphically integrating one or more virtual objects into the surrounding scene consists, according to the invention, of delimiting a free space, which can be attained by the motor vehicle without the risk of a collision, from an obstacle space, which can be attained only with the risk of a collision. According to the invention, the graphical elements, which are superimposed on the scene image, in the surrounding scene embody at least one virtual boundary object, which exhibits a three dimensional spatial shape and which exhibits at least one reference surface, which delimits a free space, which can be attained by the motor vehicle without the risk of a collision, from an obstacle space, which can be attained only with the risk of a collision.

Depending on the embodiment and/or the depicted surrounding scene, the graphical elements can embody a single boundary object or a plurality of such boundary objects. All or only selected graphical elements may contribute to the embodiment. Insofar as the graphical elements do not contribute to the embodiment of a boundary object, they can be superimposed on the scene image for other purposes.

In order to optimally assist the driver, the three dimensional spatial shape of the at least one boundary object is defined, according to the invention, in such a manner that the driver can ideally recognize by intuition a reference surface, which is crucial for delimiting the free space from the obstacle space, but no later, however, than after suitable instructions. Such a reference surface can be, for example, a portion of the surface of a boundary object. Similarly, however, it can also be an area, which, if desired, is not itself graphically represented in the scene image and which follows from the three dimensional spatial shape of at least one boundary object, for example, a symmetry surface. The reference surface include can include completely or piece-by-piece a single surface or a plurality of flat surfaces and/or a single hypersurface or a plurality of spatially curved hypersurfaces.

Preferably, the graphical elements are configured and arranged in the scene image such that the delimitation between free space and obstacle space by way of the at least one reference surface is substantially continuous in the horizontal direction. The addition "horizontal" refers to the three dimensional surrounding scene. Owing to the continuous horizontal delimitation in the surrounding scene there is no uncertainty in the driver's mind as to how the free space and the obstacle space are to be delimited in any intermediate spaces between a plurality of reference surfaces or in the recesses of a reference surface. Rather an otherwise continuous delimitation makes it possible to configure the representation in such a manner that any intermediate spaces that might exist between the reference surfaces or the recesses in reference surfaces are to be defined as an especially wide expansion of the free space or the obstacle space. Such a configured rendering is easy to implement from an engineering viewpoint and easy for the driver to interpret especially in connection with the envisaged inventive rendering of boundary objects having a three dimensional shape.

In addition, a substantially continuous horizontal delimitation helps the driver in interpreting the spatial shape of the at least one virtual boundary object and, thus, the drawing of information, presented by such a boundary object.

Since only that portion of the surrounding image that is imaged in the scene image can be inspected by the driver, the definition and rendering of the at least one boundary object can be limited to this portion. Thus, the horizontal continuity of the at least one boundary object also relates only to this portion of the surrounding scene.

Preferably, the height of a depicted boundary object or a height profile of the same in the surrounding scene is chosen essentially constant, but can, as an alternative, be configured so as to be variable, for example, for elucidating the properties of obstacles, for example, the height or the flexibility of obstacles. Preferably, the height of a depicted boundary object is chosen so low that it occludes only a relatively small portion of the surrounding scene—in particular, the obstacle space—but is chosen adequately high in order to illustrate the delimiting character of the boundary object.

In order not to occlude, in particular, components of the surrounding scene that are arranged in the obstacle space and in order not to prejudice the driver in his interpretation of the scene, the graphical elements, which embody the at least one virtual boundary object, are configured preferably partially at least semi-transparent. In this case the at least one virtual boundary object is also at least to a certain extent totally or partially transparent and enables the recognition of components of the surrounding scene, which are arranged, starting from the observation point, behind the boundary object.

According to a preferred further development of this optional feature of the present invention, the transparency of the graphical elements is adapted to the surrounding scene or its components as a function of the brightness and/or the contrast.

In particular, in the event that the boundary objects are configured so as to be totally or approximately transparent, all or selected contours or contour areas of the respective boundary object exhibiting less transparency are configured preferably as the area and volume contents of the object. Under some circumstances the contours can be configured so as to be completely opaque. Since the contours of the at least one virtual boundary object can be clearly recognized in this way, the three dimensional shape of the boundary object can be easily interpreted by the driver. Since the low or non-existing transparency relates only to the contours (which are usually thin) of the at least one boundary object, there is hardly any increased masking of the obstacle space.

As an alternative or in addition, an improved recognizability of the contours and, thus, better interpretability of the spatial shape of the at least one boundary object can also be achieved by varying the color between the contours and the adjacent area and volume contents.

The inventive rendering of a boundary object having a three dimensional spatial shape implies, according to a preferred embodiment of the present invention, a perspective distortion of the object, which is manifested in the scene image, for example, in a convergence of lines, which in the surrounding scene move in parallel away from the observation point. In addition or as an alternative, the at least one boundary object is depicted preferably in a perspectively scaled manner. This means that the shape and size of the rendering of the object in the scene image are selected as a function of the distance between the virtual limit point and the observation point.

Preferably, an eventual perspective scaling and/or distortion of the at least one boundary object occurs/occur in proportion to the scaling and/or distortion of the real components of the surrounding scene. From an engineering viewpoint this can be achieved, for example, by a three dimensional modeling of the at least one boundary object on the scale of the surrounding scene and a graphical representation, the parameters of which—in particular, the viewing position and opening angle—correspond to those of the scene image. Such a proportional scaling and/or distortion results/result in a representation, which can be perceived by the driver as realistic and is, thus, easy to interpret.

As an alternative, any eventual perspective scaling and/or distortion of the at least one boundary object can also be carried out overproportionally or underproportionally. In particular, an over proportional scaling can enhance the driver's impression that the object is approaching or moving away from the observation point.

Preferably, the three dimensional spatial shape of the at least one boundary object is chosen in such a manner that for the driver the free space is delimited as clearly as possible from the obstacle space. Therefore, the graphical elements, which are superimposed on the scene image, are preferably configured and arranged in the scene image in such a manner that the at least one virtual boundary object exhibits a surface, which faces the free space and is arranged in essence vertically in the surrounding scene. Such a surface is usually recognized with ease by the driver as the reference surface for delimiting the free space from the obstacle space.

To this end, when the observation point is arranged in the free space, such a surface is usually totally visible from this observation point. Another advantage of the essentially vertical design of such a surface lies in the fact that it produces in the driver the impression of the inaccessibility of the obstacle space and, thus, assists him in interpreting the surrounding scene.

As an alternative, a targeted variation of the slope or the variation in the progression of the slope of the reference surface, represented by a boundary object, in particular a surface, facing in essence the free space, is contemplated. In this way properties of the obstacles, for example the flexibility of obstacles or a risk produced by obstacles, are conveyed to the driver. Hence, for example, a vertical reference surface can be formed in front of a stone wall, whereas brush is represented by a slightly ascending ramp. Optionally, such a mode of representation assumes an interpretation of a scene that is not explained in detail here.

For the purpose of ease of interpretation and a clear delimitation between the free space and the obstacle space by use of the reference surface, the graphical elements are preferably configured and arranged in the scene image in such a manner that the at least one virtual boundary object exhibits a slight spatial expansion in the direction orthogonal to the reference surface. Such a variant of the invention usually also requires that the graphical elements in the scene image partially hide the components of the obstacle space.

In addition to or as an alternative, the reference surface of the boundary object is defined and graphically represented above the plane of travel so that it is preferably spatially in essence adjacent to the plane of travel, in order to contribute to the ease of interpretation and a clear delimitation. In this respect the plane of travel is defined as that plane that is usually in essence flat and on which the motor vehicle is moved. Usually, the plane of travel is defined by the road surface.

The adjacency of the reference surface to the plane of travel is equivalent, according to most of the preferred embodiments of the invention, to a resting of the at least one boundary object on the plane of travel. In particular, in the case of a two dimensional presentation of a scene image, the awareness of a vertical reference is very useful to the driver for an easy spatial interpretation of the spatial arrangement of the depicted virtual objects. Insofar as the driver can assume that a depicted virtual object rests on a certain plane, here the plane of travel, the driver can dispense with a visualization of other optical reference points, such as the rendering of shade, which would otherwise be necessary for clearly defining the spatial arrangement. As an alternative to the direct adjacency of the reference surface to the plane of travel, theoretically any distance between the reference surface and the plane of travel can be chosen, but then it must be assumed that the driver is preferably aware of the distance.

According to an especially preferred embodiment of the present invention, the reference surface of the at least one boundary object is defined and graphically represented above the plane of travel so as to be adjacent in essence to the plane of travel, only if the spatial shape of the boundary object, its spatial arrangement in the surrounding scene, in particular its horizontal distance from the observation point, as well as the observation point and the opening angle of the scene, will result in a complete rendering of the boundary object in the scene image or at least a rendering that is adequate enough to recognize the reference surface. For example, this is not the case if a boundary object exhibiting a negligible height in the surrounding scene is located at least to some extent so close to the motor vehicle that at least one part of the boundary object is not visible in the scene image from a raised observation point. In such a case the vertical position of the boundary object in the surrounding scene is changed, according to the especially preferred embodiment of the present invention, in such a manner that the boundary object is totally visible or at least to such an extent that is adequate for recognizing the reference surface. Hence, the vertical arrangement of the boundary object in the surrounding scene is chosen as a function of the horizontal distance between the same and the observation point. As an alternative or in addition to a change in the vertical position of the boundary object in the surrounding scene, a change in the spatial shape of the boundary object, in particular in its height, and/or an adaptation of the observation point and/or the opening angle is/are also contemplated.

The result of a combination of a surface of the at least one virtual boundary object (said surface facing the free space and being arranged in essence vertically in the surrounding scene), of a slight spatial expansion of the boundary object in a direction orthogonal to the reference surface, and of an adjacency of the reference surface to the plane of travel, is an essentially fence-shaped design of the at least one boundary object. Such a design is especially advantageous since the symbolic significance of a fence in the sense of a limit is usually known to the driver from his experience and, thus, is comprehensible by intuition. In addition, the spatial shape of a fence, which is graphically rendered in two dimensions or in three dimensions, is easy for most drivers to interpret even in the event of a very complicated horizontal shape outline.

The height of a depicted fence or the course of the height along the fence is preferably in essence constant in such a representation, but as an alternative, it can be configured so as to be variable, as already stated in general above. Even a targeted variation of the slope or a variation in the course of the slope of a fence-shaped boundary object and, thus, a conscious deviation from the vertical arrangement of the reference surface in the surrounding scene can serve, as also stated in general above, to offer the driver information that is clearer and/or easier to interpret.

The advantages of the aforementioned metaphor of a fence apply in the same way to other metaphors, such as that of a delimitation cord or a wall. The calculation and graphical rendering of such boundary objects can be inferred in an analogous way by the person skilled in the art.

In order to enhance such a metaphor, a graphical texture can be applied on the surface of a graphically rendered boundary object. Such a texture can also be configured so as to be semi-transparent.

As an alternative or in addition, the color and/or color distribution of the graphical elements, embodying the at least one virtual boundary object, is/are chosen, according to a preferred embodiment of the present invention, as a function of the distance between the section of the at least one virtual boundary object that embodies the respective graphical element or a portion thereof, and a reference point, a reference line or a reference surface of the motor vehicle. Preferably, the typical signaling colors—red, yellow and green—or shades thereof are used.

The at least one virtual boundary object, in particular its surface, can be made up of areas and/or surface sections of uniform coloration or can exhibit a continuous color progression. Insofar as the at least one virtual boundary object exhibits a surface, which is assembled piece-by-piece of flat surface segments, the surface segments are preferably colored in one uniform color. This makes it especially easy to calculate and graphically render an image. The color of a surface segment can be defined as a combined shade from the colors of the adjacent surface segments. For example, a surface segment, which is located between a very near red surface segment and a further away yellow surface segment, can be colored in the mixed shade of orange. Almost just as easy is to color a surface segment by coloring section-by-section in the colors of the adjacent surface segments. For example, a surface segment, which is located between a very near red surface segment and a further away yellow surface segment, can be colored partially in red and partially in yellow. If the surface segment that is to be colored is located between a very near red surface segment and a very distant green surface segment, a yellow color section can be inserted between a red and a green color section. As another alternative, a continuous color transition between the colors of the adjacent surface segments is contemplated.

The spatial shape of the at least one virtual boundary object, in particular the reference surface resulting from this spatial shape, can be defined, in principle, in any arbitrary space. Since the motor vehicle is moved in essence along the plane of travel, in particular the spatial progression of the reference surface along the plane of travel is decisive for an effective delimitation between the free space and the obstacle space. According to an aforementioned preferred embodiment of the present invention, the delimitation by the at least one reference surface occurs in essence continuously in the horizontal direction. For the sake of simplicity, the following description assumes a single continuous reference surface, which is reproduced graphically by way of a fence-shaped boundary object. However, the invention is not restricted to this special case.

In order to determine the course of the delimiting reference surface along the plane of travel, there is usually only a limited number of distance measurement points. Therefore, the at least one reference surface of the at least one virtual boundary object is preferably defined at least partly as a linear, piece-by-piece linear or non-linear interpolation between a limited quantity of support points or support lines at a known distance from a reference point, a reference line or a reference surface of the motor vehicle.

Whether support points and/or support line are obtained, the method by which they are obtained and the fact whether the support points and/or support lines in turn relate to a reference point of the motor vehicle, for example, the mounting location of a sensor, a reference line (for example, the vehicle contour), or a reference surface, for example the actual surface of the motor vehicle, is a function of the underlying distance measurement method and an evaluation of the measurement signals, said evaluation following the measurement and optionally based on a model. The reference surface, obtained from the support points and/or support lines, may, but do not necessarily have to, include the support points and/or the support lines themselves.

The separate or selectively combined use of various known techniques and devices for recognizing the surroundings of motor vehicles is also contemplated herein, for example, by use of radar, ultrasound-based, camera-based and/or light transit time-based techniques. Especially economical is the use of systems, with which the motor vehicle is equipped in any event for other purposes. Preferred is the separate or combined use of ultrasound-based position sensors, which are present in many vehicles, and a camera, which is required, according to various embodiments of the present invention, for capturing images of the surrounding scene—in particular, a reversing camera.

Preferably, every distance measurement method that is used for measuring the distance is configured and adapted in such a manner that the respective sensor characteristics are taken into consideration. This consideration can be expressed in either obtaining a plurality of support points and/or support lines from a single measurement or in the type of interpolation. In the case of an ultrasound-based distance measurement, a recorded reflecting point can be located theoretically at any spot on a hypersurface, which typically exhibits in essence a club shape. This can be taken into consideration, for example, by integrating a plurality of points of the hypersurface in the interpolation process and/or by an interpolation curve or surface, the shape of which depends—at least section-by-section—on the shape of the hypersurface.

A camera-based distance measurement can be carried out, for example, in a well-known way with the aid of a grid light that is integrated into the camera system.

Instead of an interpolation or as preparation for the same, an obstruction map of the surrounding scene can be prepared, according to an advantageous further development of the invention, on the basis of an environment recognition process that was carried out. In order to obtain such an obstruction map, the results of the environment recognition process are used preferably in a well-known manner to recognize and localize objects—optionally on the basis of a model. Then, the obstruction map that is obtained thus is used to define the at least one boundary object or reference surface. The availability of an obstruction map opens up the possibility of a number of other different embodiments of an inventive method that are associated to some extent with considerable simplifications and/or with achieving accuracy. For example, recognized obstacles can be delimited graphically—individually or in groups—by use of at least one virtual boundary object, which can be obtained directly from the obstruction map. According to a special case of the present invention, a geometric model of a recognized obstacle can serve directly as the boundary object or as a part of a boundary object.

Preferably, the distance measurement values, the support points and/or the support lines, the obstruction maps and/or the reference surfaces—all of which are obtained by way of an inventive method—an be used for other purposes associated with assisting the driver. To this end, the quantities that are obtained can be either transmitted from the devices, which carry out the inventive method, to other devices of the motor vehicle or outside the motor vehicle; or the quantities that are obtained can be passed on to processing processes, in which the same devices of the motor vehicle that also carry out the inventive method are involved. In the event of such multi-usage of data, the use of both raw data and the end or intermediate results of an inventive method is contemplated. The application, in turn, can occur as raw data material and/or on any higher processing level. Such a multiple usage can reduce the entire engineering costs; and/or a second driver assistance system can be improved with respect to accuracy and/or efficiency.

In particular, data, which are calculated according to an inventive method, can (also) be used, along with the inventive graphical representation for the driver, as the basis for an automatic shunting and parking assistance device. On the basis of such a multi-usage or irrespective thereof, a preferred further development of the invention provides a method and/or device, which puts the driver in a position to observe with the aid of an inventive graphical representation how his motor vehicle is being maneuvered automatically under the guidance of the shunting and parking assistance device. Preferably, the driver is also given the chance to engage in the maneuvering of the shunting and parking assisting device.

In case of doubt, preferably both the support lines or support points and the reference surface or sections of the same are moved, during the calculation and representation, in the direction of the free space in order to rule out an unwanted collision or to make such a collision as improbable as possible. For the driver, who will usually not risk penetrating into the indicated obstacle space, this denotes a certain restriction. The lower the uncertainty of the measurement and/or calculation and/or display, the lower this restriction can be kept.

Another advantage of the inventive method that has not been explicitly mentioned in the previous embodiments lies in the fact that under poor visibility conditions or in the dark, the augmentation of the scene image with graphical elements significantly improves the usability of the scene image or makes it now useful.

On the one hand, this is true, because the at least one virtual boundary object remains identifiably different from the real components of the surrounding scene even under poor visibility conditions or in the dark. However, this is true to a greater extent, because, when the real components of the surrounding scene are poorly or not at all discernible, the inventive three dimensional spatial shape of the at least one boundary object now permits a spatial interpretation of the augmented scene image. In contrast, the mere use of artificial lines, as disclosed in the prior art, does not permit the majority of the drivers to make any allocation at all between the depicted image and the spatial conditions of the surrounding scene under poor visibility conditions or in the dark.

The above considerations with respect to poor visibility or darkness apply to the same extent in the absence of the capture or representation of the scene image. The inventive representation of the at least one boundary object can also be interpreted by the driver independently, i.e., without any underlying real image of the surrounding scene. The same applies in the case of a time-delayed representation of the real image. The driver can orient himself then with the aid of the at least one boundary object, which leads in time.

A plurality of different embodiments of an inventive method are based on a geometric (usually three dimensional) modeling of obstacles, contained in an obstruction map, and/or at least one boundary object. The result may be another advantage of the invention. Upon recognition that a vehicle has moved from an old vehicle position to a new vehicle position, such a geometric model permits one to calculate new graphical elements that apply to the new vehicle position. When using an obstruction map, a totally new boundary object, which applies to the new position of the vehicle, can be calculated and visualized under certain circumstances. In other methods for calculating the at least one boundary object, only one new imaging of a boundary object, which has not changed even after the vehicle has moved, in the scene image is calculated. In this respect with every change in the observation position and/or a change in the reference variables, which eventually go into the calculation, the movement of the vehicle must be taken into consideration.

Therefore, based on the geometric model alone, new graphical elements can be predicted from the movement of the vehicle.

This feature can be exploited in a plurality of ways. On the one hand, a plausibility check can be carried out between a representation, calculated from such a prediction, and a representation, calculated on the basis of new distance measurements. On the other hand, it is possible that—for example, at a low measurement rate of the environment recognition process—the predicted representation is available faster than a representation, calculated on the basis of new distance measurements. In this way a more fluid and, for the driver, a more easily interpretable augmentation of the scene image could be performed. For example, then the graphical elements could be calculated and represented only at regular or irregular intervals on the basis of new distance measurements and in the meantime on the basis of the model-based prediction.

In principle, at least one dedicated computing unit in the motor vehicle can be provided in order to carry out all or some of the calculations required to apply a method according to the invention. As an alternative or in addition, some or all of the calculations can be carried out advantageously with one computing unit or a plurality of computing units that are already provided in the motor vehicle for other purposes. Similarly, the distance measurement and/or the image capturing and/or image output, which is/are necessary for applying a method, according to the invention, can take place by use of dedicated devices and/or by use of devices that are appropriate for such purposes and are already provided in the motor vehicle for other purposes.

According to preferred embodiments of the present invention, the driver is given the opportunity to influence an inventive method by way of operational inputs. The operating elements, which are provided to this end, can be configured in the form of operating elements, configured in hardware, and/or in the form of graphical elements in the augmented scene image. For the latter embodiment, the image representation means, which are used in a method according to the invention, must be suitable for the corresponding inputs—for example, configured as a touch screen.

Other objects, advantages and novel features of the present invention will become apparent from the following detailed description of the invention when considered in conjunction with the accompanying drawings.

DETAILED DESCRIPTION OF THE DRAWINGS

According to a first preferred embodiment of the present invention, a two dimensional scene image of the three dimensional surrounding scene of the rear space of the motor vehicle is captured with a reversing camera in a motor vehicle for assisting the driver, especially in reversing and parking maneuvers. The captured scene image is prepared by a computing unit and output to the driver in the prepared form via a monitor, disposed in the motor vehicle.

The preparation of the scene image consists of superimposing the graphical elements on the captured camera image. The graphical elements embody jointly a single virtual boundary object or a plurality of virtual boundary objects, which are arranged in the surrounding scene. The boundary objects delimit the free space, which can be attained by the motor vehicle without the risk of a collision, from the obstacle space, which can be attained only with the risk of a collision.

Figure 1:
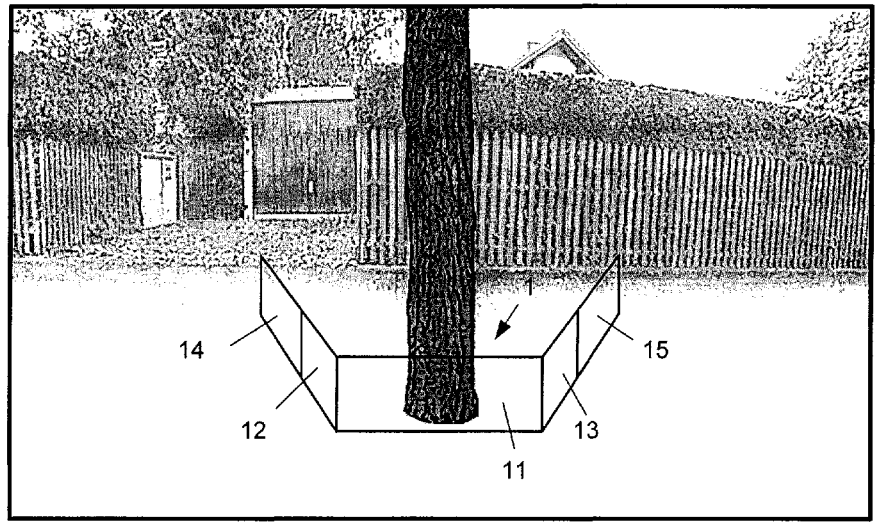
FIG. 1 is a schematic drawing of a first example for superimposing graphical elements on a two dimensional scene image of a three dimensional surrounding scene, according to a first preferred embodiment of the present invention.
Figure 2:
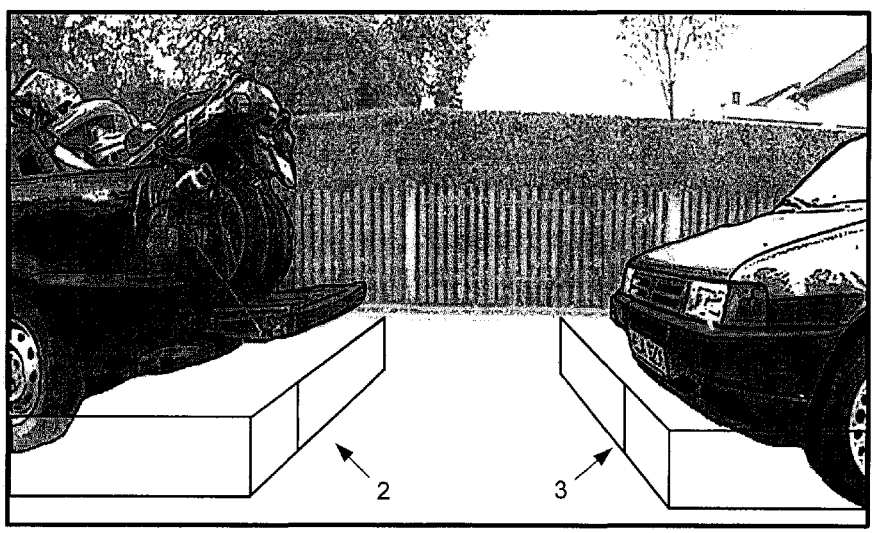
FIG. 2 is a schematic drawing of a second example for superimposing graphical elements on a two dimensional scene image of a three dimensional surrounding scene, according to a first preferred embodiment of the present invention.
Figure 3:
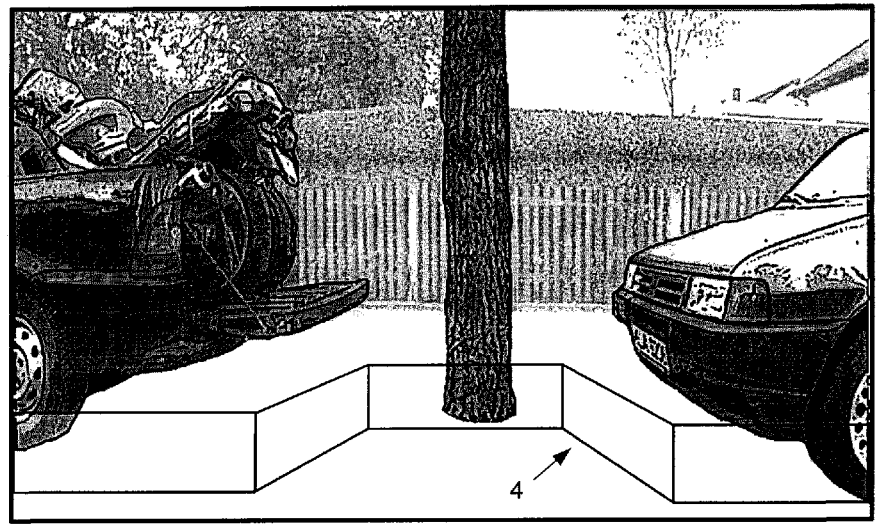
FIG. 3 is a schematic drawing of a third example for superimposing graphical elements on a two dimensional scene image of a three dimensional surrounding scene, according to a first preferred embodiment of the present invention.

FIG. 1, FIG. 2 and FIG. 3 are snapshots of the prepared scene image that have been outputted to the driver. In FIG. 1, a tree trunk forms the obstacle in the obstacle space, located in the background of the image. In FIG. 2, two parked vehicles are located in the obstacle space. In FIG. 3, two parked vehicles and a tree trunk are located in the obstacle space. The virtual boundary object 1, depicted in FIG. 1, the virtual boundary objects 2 and 3, depicted in FIG. 2, and the virtual boundary object 4, depicted in FIG. 3, exhibit an essentially fence-like shape and have a constant height (here 25 cm) in the three dimensional surrounding scene.

For the sake of simplicity, the following description will refer in the singular to a single boundary object. However, this mode of expression should always be understood to include the case of a plurality of boundary objects and/or a multi-part boundary object. The computational and graphical treatment of a plurality of boundary objects can be inferred by the person skilled in the art in an analogous manner.

An essential component of the information, transmitted to the driver by way of the depicted scene images, is the spatial course—in particular, the horizontal course—of the area, which is referred to below as the reference surface, which is represented graphically by the at least one boundary object and which is separated from the obstacle space in a manner that can be recognized by the driver. In the present example, the reference surface is graphically rendered as the surface of the boundary object.

In the present example, the free space is delimited section-by-section from the obstacle space in a continuous manner. In principle, the rendering mode, on which the drawings in FIG. 1, FIG. 2 and FIG. 3 are based, envisages a completely horizontal, continuous delimitation, i.e., extends over the entire width of the scene image. Yet in certain sections of the surrounding scene and in the corresponding sections of the scene image, in which a reference surface would exceed a certain distance, in the present example 3 m, from the vehicle, no reference surface is calculated and represented. As a result, only in FIG. 3 is a completely horizontal, continuous delimitation represented, whereas the representation of the boundary objects in FIG. 1 and FIG. 2 does not extend over the entire width of the scene image.

Before entering into the details of how the reference surface is represented, its calculation will be explained briefly below. The reference surface is defined on the basis of data, obtained by the environment recognition process of the motor vehicle. In the present example, these data are from the ultrasonic sensors that are integrated into the rear end of the vehicle.

Therefore, the distance between a plurality of spatial points in the surrounding scene and a reference point on the motor vehicle (in the present example, the mounting location of the respective ultrasonic sensor) is determined in a well-known manner. At a very high horizontal measurement resolution, these spatial points would lie on the surface of the obstacles. At a less high measurement resolution, the respective sensor characteristic must be considered in the sense of a worst case scenario. A reflecting point, which is acquired by an ultrasound single measurement, can be located in theory at any arbitrary point on the hypersurface, which exhibits typically the shape of a club. Then in each measurement at least two opposing vehicle near points are defined on this hypersurface as the spatial points. The spatial points that are defined by this method are usually located in the free space in front of an obstacle, optionally slightly to one side in front of said obstacle.

For each of the defined spatial points, a support line, which runs vertically in the surrounding scene, is defined by way of the respective spatial point.

The boundary object 1, depicted in FIG. 1, is also based, for example, on an ultrasound measurement, in which the tree, which is visible in FIG. 1, was detected with at least one ultrasonic sensor. In accordance with the horizontal club-shaped characteristic of the sensors that are used, two spatial points were defined on the left and the right edge of the club on the basis of this measurement. In FIG. 1, the two support lines, which are defined in this manner, correspond to the separating line between the surface 11 and the surface segment 12 or the separating line between the surface 11 and the surface segment 13. Both separating lines are vertical both in the scene image in FIG. 1 and in the surrounding scene.

Since the distance between the defined spatial points and the respective sensor mounting location is known from the ultrasound distance measurement, the distance between the support lines, which are defined vertically, as described, in the surrounding scene, and its mounting location, is also known. In the present case, the support lines represent only the expansion of the spatial points on the vertical dimension of the surrounding scene. Taking into consideration the mounting locations of the ultrasonic sensors on the motor vehicle (these locations being known from a geometric vehicle model), the distance between the support lines and the vehicle contour is calculated on the basis of the model.

In the simplest case, the reference surface is defined as a piece-by-piece linear interpolation between the defined support lines. In this respect the interpolation refers, in particular, to the horizontal course of the reference surface in the surrounding scene. In the present example, the vertical course of the reference surface is adequately defined by the shape of a vertical fence of constant height.

Expediently, the height of the previously defined support lines is defined as the same height of the fence (here 25 cm). It is just as practical to choose the bottom end of the support lines as the point in the plane of travel. The support lines and the reference surface are arranged above the plane of travel in the surrounding scene, thus adjacent to the plane of travel.

As stated above, no reference surface is calculated and represented in the sections of the surrounding scene and in the corresponding sections of the scene image, in which the reference surface would exceed a certain distance, in the present example 3m, from the vehicle. As a result, the calculated reference surface may have a plurality of segments; or from other perspectives, the result may be a plurality of reference surfaces. For the sake of simplicity, a single reference surface is used for the discussion below. The calculation and graphic treatment of a plurality of segments of a reference surface and/or a plurality of reference surfaces follows in an analogous manner.

The evaluation of the ultrasound measurements and the above described definition of the reference surface are carried out by a computing unit that is disposed in the vehicle. Furthermore, this computing unit is suitable for graphically rendering three dimensional objects as well as for acquiring image data of a camera and for outputting the image data to a monitor.

The computing unit produces a three dimensional boundary object on the basis of the reference surface that is defined as described above. The boundary object exhibits a surface, which extends vertically in the surrounding scene and faces the free space and which has the shape of the reference surface. As stated above, for this purpose a fence-shaped boundary object is produced in the present invention. In addition, a perspective two dimensional graphical rendering of the boundary object is produced. The parameters of the boundary object—in particular, the observation position and the opening angle—match those of the reversing camera.

This computing unit is sent a real image of the surrounding scene that is captured by the reversing camera. The graphical rendering of the boundary object is superimposed on the real image, which is captured by the reversing camera, by way of the computing unit and displayed by the monitor.

According to the first preferred embodiment of the present invention, which is depicted, as an example, in the drawings in FIG. 1, FIG. 2, and FIG. 3, the boundary objects are configured semi-transparent, in order not to entirely mask the components of the obstacle space, said components being located behind the boundary objects in the scene image.

Since the rendering of the boundary objects agrees in both their perspective and spatial aspects, they are interpreted by the driver as components of the surrounding scene. As a result of their fence-shaped design, the boundary objects are intuitively recognized by the driver as boundaries. Owing to the negligible width of the fence, its surface, facing the free space, is in essence spatially identical to its surface, facing the obstacle space. This surface can be intuitively recognized by the driver as the reference surface of the delimitation between the free space and the obstacle space.

The perspectively distorted and scaled rendering of the fence as a result of the above described method assists the driver in his spatial interpretation of the surrounding scene. Furthermore, the driver is assisted by a symbolic coloration of the fence (described below) in his spatial interpretation of the surrounding scene. For this purpose, the areas of the depicted boundary objects are assigned proportionally or totally certain colors in the graphic rendering. The colors are assigned as a function of the distance between the adjacent support lines and the motor vehicle.

In the present example, the surfaces, whose adjacent support lines are less than 1 m away from the motor vehicle, are shown in red. The color yellow corresponds to a distance ranging from 1 m to 2 m; the color green, to a distance ranging from 2 m to 3 m. At a distance of more than 3 m, there is no rendering, as stated above.

If the two adjacent support lines of an area of a boundary object are located in different color zones, the area is divided into surface segments of different coloration. In so doing, the surface segments are defined exactly in such a manner that the color change takes place at the transition point between the color zones.

For example, in FIG. 1, the surface 11 and the two surface segments 12 and 13 are colored yellow. The surface segments 14 and 15 are colored green, in order to mark a distance further away from the vehicle, here more than 2 m.

If in FIG. 1 the motor vehicle were to approach the tree in a straight line by approximately 1 meter (not illustrated here), the boundary object would continue to be depicted in its unchanged spatial shape, condition and position in the surrounding scene—assuming that the obstacles have not changed their arrangement. However, in so doing, its shape, condition and position in the scene image would change—for example, the boundary object would grow perspectively larger owing to the approach. In addition, the surface 11 and the two surface segments 12 and 13 would be colored red; the surface segments 14 and 15, yellow.

As stated above in an earlier passage, the surfaces and the surface segments are not depicted as non-transparent surfaces of the respective color, but as semi-transparent.

Figure 4:
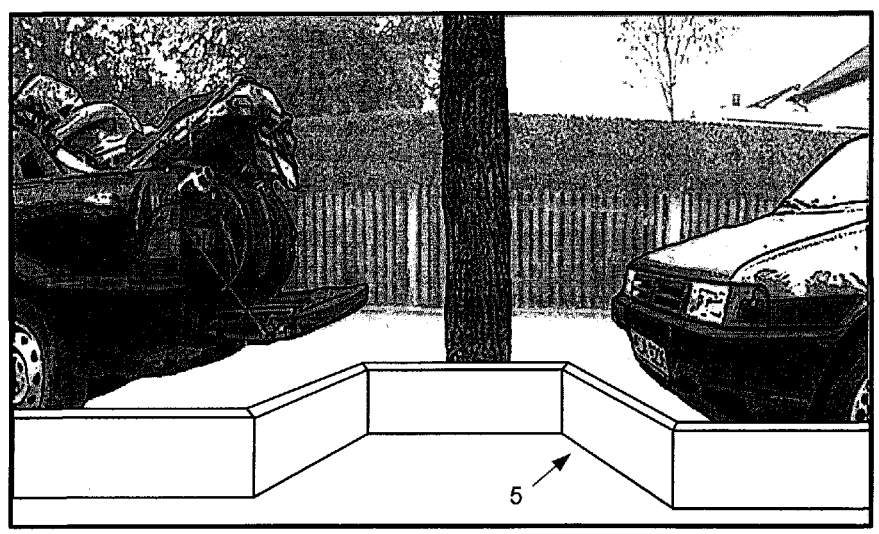
FIG. 4 is a schematic drawing of an example for superimposing graphical elements on a two dimensional scene image of a three dimensional surrounding scene, according to a second preferred embodiment of the present invention.

FIG. 4 shows an example of a superimposition of graphical elements on a two dimensional scene image of a three dimensional surrounding scene, according to a second preferred embodiment of the present invention.

FIG. 4 relates to the same surrounding scene, as in FIG. 3. The major distinction between the drawing of FIG. 4 from that of FIG. 3 lies in the fact that the boundary object 5, as compared to the boundary object 4, is depicted as non-transparent and has a larger spatial expansion in the direction orthogonal to the reference surface.

Even in the drawing, according to FIG. 4, the surface of the boundary object 5 that faces the free space and is vertical in the surrounding scene can be intuitively recognized by the driver as the reference surface for delimiting the free space from the obstacle space.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for graphically representing surroundings of a motor vehicle using a scene image, which represents a three-dimensional surrounding scene of the surroundings of the motor vehicle and which is output two dimensionally or three dimensionally to a display device for viewing by a user of the motor vehicle, the method comprising the acts:

superimposing, by a graphical rendering unit disposed in the motor vehicle, graphical elements on the scene image, the graphical elements serving to assist the user in interpreting spatial information contained in the scene image, wherein the graphical elements and the scene image are displayed on the display device; and at least partially configuring and arranging, by the graphical rendering unit, the graphical elements in the scene image such that the graphical elements embody in the surrounding scene at least one virtual boundary object, which has a three dimensional spatial shape and which exhibits at least one reference surface delimiting a free space attainable by the motor vehicle without risk of a collision from an obstacle space attainable by the motor vehicle only with the risk of a collision, wherein a height profile of the at least one virtual boundary object and a course of a slope of the at least one reference surface of the at least one boundary object are determined as a function of properties of an obstacle in the surroundings of the motor vehicle, wherein the at least one virtual boundary object has a spatial expansion in a direction orthogonal to the at least one reference surface.

2. The method as claimed in claim 1, wherein the graphical elements are configured and arranged in the scene image such that the delimitation by way of the at least one reference surface is substantially continuous in a horizontal direction.

3. The method as claimed in claim 2, wherein the graphical elements embodying the at least one virtual boundary object are at least partially configured to be semi-transparent.

4. The method as claimed in claim 2, wherein the at least one virtual boundary object is depicted proportionally or overproportionally by at least one of scaled and distorted perspectives.

5. The method as claimed in claim 2, wherein the graphical elements in the scene image comprise at least one of:
   a configuration and arrangement such that the at least one virtual boundary object exhibits a surface, which faces the free space and is arranged essentially vertically in the surrounding scene; and
   a configuration and arrangement such that the at least one virtual boundary object exhibits a slight spatial expansion in a direction orthogonal to the reference surface.

6. The method as claimed in claim 2, wherein the at least one reference surface of the at least one boundary object is calculated on the basis of an obstruction map and/or a geometric model of recognized obstacles.

7. The method as claimed in claim 1, wherein the graphical elements embodying the at least one virtual boundary object are at least partially configured to be semi-transparent.

8. The method as claimed in claim 7, wherein the at least one virtual boundary object is depicted proportionally or overproportionally by at least one of scaled and distorted perspectives.

9. The method as claimed in claim 7, wherein the graphical elements in the scene image comprise at least one of:
   a configuration and arrangement such that the at least one virtual boundary object exhibits a surface, which faces the free space and is arranged essentially vertically in the surrounding scene; and
   a configuration and arrangement such that the at least one virtual boundary object exhibits a slight spatial expansion in a direction orthogonal to the reference surface.

10. The method as claimed in claim 1, wherein the at least one virtual boundary object is depicted under-proportionally when the motor vehicle is moving away from the at least one virtual boundary object and overproportionally when the motor vehicle is approaching the at least one virtual boundary object.

11. The method as claimed in claim 10, wherein the graphical elements in the scene image comprise at least one of:
   a configuration and arrangement such that the at least one virtual boundary object exhibits a surface, which faces the free space and is arranged essentially vertically in the surrounding scene; and
   a configuration and arrangement such that the at least one virtual boundary object exhibits a slight spatial expansion in a direction orthogonal to the reference surface.

12. The method as claimed in claim 1, wherein the graphical elements in the scene image comprise at least one of:
   a configuration and arrangement such that the at least one virtual boundary object exhibits a surface, which faces the free space and is arranged essentially vertically in the surrounding scene; and
   a configuration and arrangement such that the at least one virtual boundary object exhibits a slight spatial expansion in a direction orthogonal to the reference surface.

13. The method as claimed in claim 1, wherein the reference surface of the at least one boundary object is chosen essentially adjacent to a plane of travel of the motor vehicle.

14. The method as claimed in claim 1, wherein at least one of a color and color distribution of the graphical elements, embodying the at least one virtual boundary object, is chosen as a function of a distance between a section of the at least one virtual boundary object that embodies the respective graphical element or a portion thereof and a reference point, a reference line or a reference surface of the motor vehicle.

15. The method as claimed in claim 14, wherein the at least one reference surface of the at least one virtual boundary object is defined at least partly as a linear, piece-by-piece linear, or non-linear interpolation between a limited quantity of support points or support lines at a known distance from a reference point, a reference line or a reference surface of the motor vehicle.

16. The method as claimed in claim 1, wherein the at least one reference surface of the at least one virtual boundary object is defined at least partly as a linear, piece-by-piece linear, or non-linear interpolation between a limited quantity of support points or support lines at a known distance from a reference point, a reference line or a reference surface of the motor vehicle.

17. The method as claimed in claim 16, wherein at least one of the following is provided:
   when the interpolation is between the support lines, the support lines are in essence vertical in the surrounding scene; and
   the interpolation is based on characteristics of a sensor system that is used for determining the distance.

18. The method as claimed in claim 1, wherein the at least one reference surface of the at least one boundary object is calculated on the basis of an obstruction map and/or a geometric model of recognized obstacles.

19. The method as claimed in claim 1, wherein the at least one virtual boundary object is fence-shaped.

20. The method as claimed in claim 19, wherein the at least one virtual boundary object has a height of about 25 cm.

* * * * *